(12) United States Patent
Nishino

(10) Patent No.: US 12,515,613 B2
(45) Date of Patent: Jan. 6, 2026

(54) WEBBING TAKE-UP DEVICE

(71) Applicant: KABUSHIKI KAISHA TOKAI-RIKA-DENKI-SEISAKUSHO, Aichi-ken (JP)

(72) Inventor: Atsushi Nishino, Aichi (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 0 days.

(21) Appl. No.: 18/660,884

(22) Filed: May 10, 2024

(65) Prior Publication Data

US 2024/0383437 A1    Nov. 21, 2024

(30) Foreign Application Priority Data

May 16, 2023    (JP) .................................. 2023081052

(51) Int. Cl.
  *B60R 22/38*    (2006.01)

(52) U.S. Cl.
  CPC .................... *B60R 22/38* (2013.01)

(58) Field of Classification Search
  CPC ....... B60R 22/38; B60R 22/36; B60R 22/405; B60R 22/4671
  See application file for complete search history.

(56) References Cited

U.S. PATENT DOCUMENTS

| | | | | |
|---|---|---|---|---|
| 4,603,819 A * | 8/1986 | Loose | ..................... | B60R 22/44 242/384.6 |
| 4,687,156 A * | 8/1987 | Mori | ..................... | B60R 22/405 242/383.1 |
| 2005/0224623 A1 * | 10/2005 | Sumiyashiki | ........... | B60R 22/41 242/384.2 |
| 2011/0127363 A1 * | 6/2011 | Tatsuma | ................ | B60R 22/405 242/383.2 |
| 2014/0042256 A1 * | 2/2014 | Yamada | ............. | B65H 75/4434 242/382.1 |
| 2016/0031412 A1 * | 2/2016 | Rink | ....................... | B60R 22/38 242/383.2 |

FOREIGN PATENT DOCUMENTS

| | | | | |
|---|---|---|---|---|
| CN | 113039100 A | * | 6/2021 | .......... B60R 22/343 |
| DE | 4423958 A1 | * | 1/1996 | .......... B60R 22/405 |
| EP | 0382870 A1 | * | 2/1989 | ............. B60R 22/36 |
| JP | 2003212085 A | | 7/2003 | |

\* cited by examiner

*Primary Examiner* — S. Joseph Morano

(74) *Attorney, Agent, or Firm* — Dority & Manning, P.A.

(57) ABSTRACT

A webbing take-up device includes a spool, a V gear that includes a first spring engagement portion, a W pawl that includes a second spring engagement portion, and a return spring provided between the first spring engagement portion and the second spring engagement portion. A boss portion that is provided to the first spring engagement portion is inserted into a one-side of the return spring. A housing section is provided to the second spring engagement portion, with an other-side of the return spring housed therein. Displacement of an end portion on the second spring engagement portion side of the return spring is limited by the housing section in a state in which the W pawl is positioned at a reset position, and in a state in which the return spring is completely compressed toward the first spring engagement portion side.

8 Claims, 8 Drawing Sheets

WEBBING TAKE-UP DEVICE

CROSS-REFERENCE TO RELATED APPLICATION

This application is based on and claims priority under 35 USC 119 from Japanese Patent Application No. 2023-081052 filed on May 16, 2023, the disclosure of which is incorporated by reference herein.

BACKGROUND

Technical Field

The present disclosure relates to a webbing take-up device.

Related Art

A webbing take-up device (seatbelt retractor) disclosed in Japanese Patent Application Laid-Open (JP-A) No. 2003-212085 includes a V gear (lock clutch body) that rotates together with a spool (take-up drum), and a W pawl (lock arm) that is supported by the V gear so as to be able to swing. In the webbing take-up device described in this related document, a compression coil spring that urges the W pawl in a one-direction is provided between the W pawl and the V gear.

However, although there is a desire to be able to suppress the compression coil spring from coming out from between the W pawl and the V gear when a shock is imparted to such a webbing take-up device, such as by dropping the webbing take-up device, there is room for improvement regarding this point in the configuration described in JP-A No. 2003-212085.

SUMMARY

In consideration of the above circumstances, an object of the present disclosure is to obtain a webbing take-up device capable of suppressing a compression coil spring from falling out when a shock is imparted.

A webbing take-up device according to a first exemplary embodiment includes a spool, a rotating body, a restricting member, an operating member, a compression coil spring, a boss portion, and a housing section. The spool is able to take up webbing fitted over an occupant, with the webbing being taken up by the spool being rotated in a take-up direction, and with the spool being rotated in a pull-out direction by the webbing being pulled out. The rotating body is rotatable accompanying rotation of the spool and includes a first spring engagement portion. The restricting member is operated to restrict rotation of the spool in the pull-out direction. The operating member is supported by the rotating body, is able to swing with respect to the rotating body, operates the restricting member by swinging from a first position side to a second position side when the rotating body has been rotated in the pull-out direction at a specific speed or greater, and includes a second spring engagement portion. The compression coil spring is provided between the first spring engagement portion and the second spring engagement portion, and urges the operating member toward the first position side. The boss portion is provided to one out of the first spring engagement portion or the second spring engagement portion, and is inserted into a one-side of the compression coil spring. The housing section is provided to the other out of the first spring engagement portion and the second spring engagement portion, with an other-side of the compression coil spring housed therein. Displacement of an end portion on the second spring engagement portion side of the compression coil spring is limited by the boss portion or by the housing section in a state in which the operating member is positioned at the first position, and in a state in which the compression coil spring is completely compressed toward the first spring engagement portion side.

A webbing take-up device according to a second aspect includes a spool, a rotating body, a restricting member, an operating member, a compression coil spring, a boss portion, and a housing section. The spool is able to take up webbing fitted over an occupant, with the webbing being taken up by the spool being rotated in a take-up direction, and with the spool being rotated in a pull-out direction by the webbing being pulled out. The rotating body is rotatable accompanying rotation of the spool and includes a first spring engagement portion. The restricting member is operated to restrict rotation of the spool in the pull-out direction. The operating member is supported by the rotating body, is able to swing with respect to the rotating body, operates the restricting member by swinging from a first position side to a second position side when the rotating body has been rotated in the pull-out direction at a specific speed or greater, and includes a second spring engagement portion. The compression coil spring is provided between the first spring engagement portion and the second spring engagement portion, and urges the operating member toward the first position side. The boss portion is provided to one out of the first spring engagement portion or the second spring engagement portion, and is inserted into a one-side of the compression coil spring. The housing section is provided to the other out of the first spring engagement portion and the second spring engagement portion, with the other-side of the compression coil spring housed therein. Displacement of an end portion on the first spring engagement portion side of the compression coil spring is limited by the boss portion or by the housing section in a state in which the operating member is positioned at the second position, and in a state in which the compression coil spring is completely compressed toward the second spring engagement portion side.

A webbing take-up device according to a third aspect is the webbing take-up device of the first aspect or the second aspect, wherein an end portion on the housing section side of the boss portion is positioned inside the housing section in all states from a state when the operating member is positioned at the first position through to a state when the operating member is positioned at the second position.

A webbing take-up device according to a fourth aspect is the webbing take-up device of any one of the first aspect to the third aspect, wherein the housing section is provided to the second spring engagement portion.

A webbing take-up device according to a fifth aspect is the webbing take-up device of any one of the first aspect to the fourth aspect, wherein a recess open on the boss portion side is formed to an end portion on the boss portion side of the housing section.

In the webbing take-up device according to the first aspect, the spool is rotated suddenly in the pull-out direction when the webbing is pulled out suddenly from the spool. Accompanying this action, the operating member swings from the first position side to the second position side when the rotating body is rotated in the pull-out direction at a specific speed or greater, and the restricting member is operated. The rotation of the spool in the pull-out direction is restricted thereby, and the webbing is limited from been pulled out from the spool. The compression coil spring that urges the operating member toward the first position side is provided between the first spring engagement portion of the rotating body and the second spring engagement portion of the operating member. Moreover, the boss portion inserted into the one-side of the compression coil spring is provided to one out of the first spring engagement portion or the second spring engagement portion. Furthermore, the housing section that houses the other-side of the compression coil spring is provided to the other out of the first spring engagement portion and the second spring engagement portion. The displacement of the end portion on the second spring engagement portion side of the compression coil spring is limited by the boss portion or the housing section in a state in which the operating member is positioned at the first position and a state in which the compression coil spring is completely compressed toward the first spring engagement portion side. This means that the compression coil spring can be suppressed from coming out from between the first spring engagement portion and the second spring engagement portion when shock is imparted to the webbing take-up device so as to compress the compression coil spring toward the first spring engagement portion side.

In the webbing take-up device according to the second aspect, the spool is rotated suddenly in the pull-out direction when the webbing is pulled suddenly from the spool. Accompanying this action, the operating member swings from the first position side to the second position side when the rotating body is rotated in the pull-out direction at a specific speed or greater, and the restricting member is operated. The rotation of the spool in the pull-out direction is restricted thereby, and the webbing is limited from been pulled out from the spool. The compression coil spring that urges the operating member toward the first position side is provided between the first spring engagement portion of the rotating body and the second spring engagement portion of the operating member. Moreover, the boss portion inserted into the one-side of the compression coil spring is provided to one out of the first spring engagement portion or the second spring engagement portion. Furthermore, the housing section that houses the other-side of the compression coil spring is provided to the other out of the first spring engagement portion and the second spring engagement portion. The displacement of the end portion on the first spring engagement portion side of the compression coil spring is limited by the boss portion or the housing section in the state in which the operating member is positioned at the second position and the state in which the compression coil spring is completely compressed toward the second spring engagement portion side. This means that the compression coil spring can be suppressed from coming out from between the first spring engagement portion and the second spring engagement portion when shock is imparted to the webbing take-up device such as the compression coil spring being compressed toward the second spring engagement portion side.

In the webbing take-up device according to the third aspect, the end portion on the housing section side of the boss portion is positioned inside the housing section in all states from the state when the operating member is positioned at the first position through to the state when the operating member is positioned at the second position. This thereby enables the compression coil spring to be even better suppressed from coming out from between the first spring engagement portion and the second spring engagement portion.

In the webbing take-up device according to the fourth aspect, the housing section is provided to the second spring engagement portion on the operating member side. This means that a manufacturing machine for the rotating body, and manufacturing processes therefor, can be suppressed from becoming complicated better than with a configuration in which the housing section is provided to the first spring engagement portion on the rotating body side.

In the webbing take-up device according to the fifth aspect, the recess open on the boss portion side is formed to the end portion on the boss portion side of the housing section. In this configuration, for example, a tool for placing the compression coil spring in a state compressed toward the housing section side can be engaged with the recess. This thereby enables good operability to be achieved when setting the compression coil spring between the first spring engagement portion and the second spring engagement portion.

BRIEF DESCRIPTION OF THE DRAWINGS

Exemplary embodiments of the present invention will be described in detail based on the following figures, wherein.

DETAILED DESCRIPTION

Basic Configuration of Webbing Take-Up Device 10

First description follows regarding a basic configuration of a webbing take-up device 10, with reference to FIG. 1 to FIG. 4.

Figure 1:
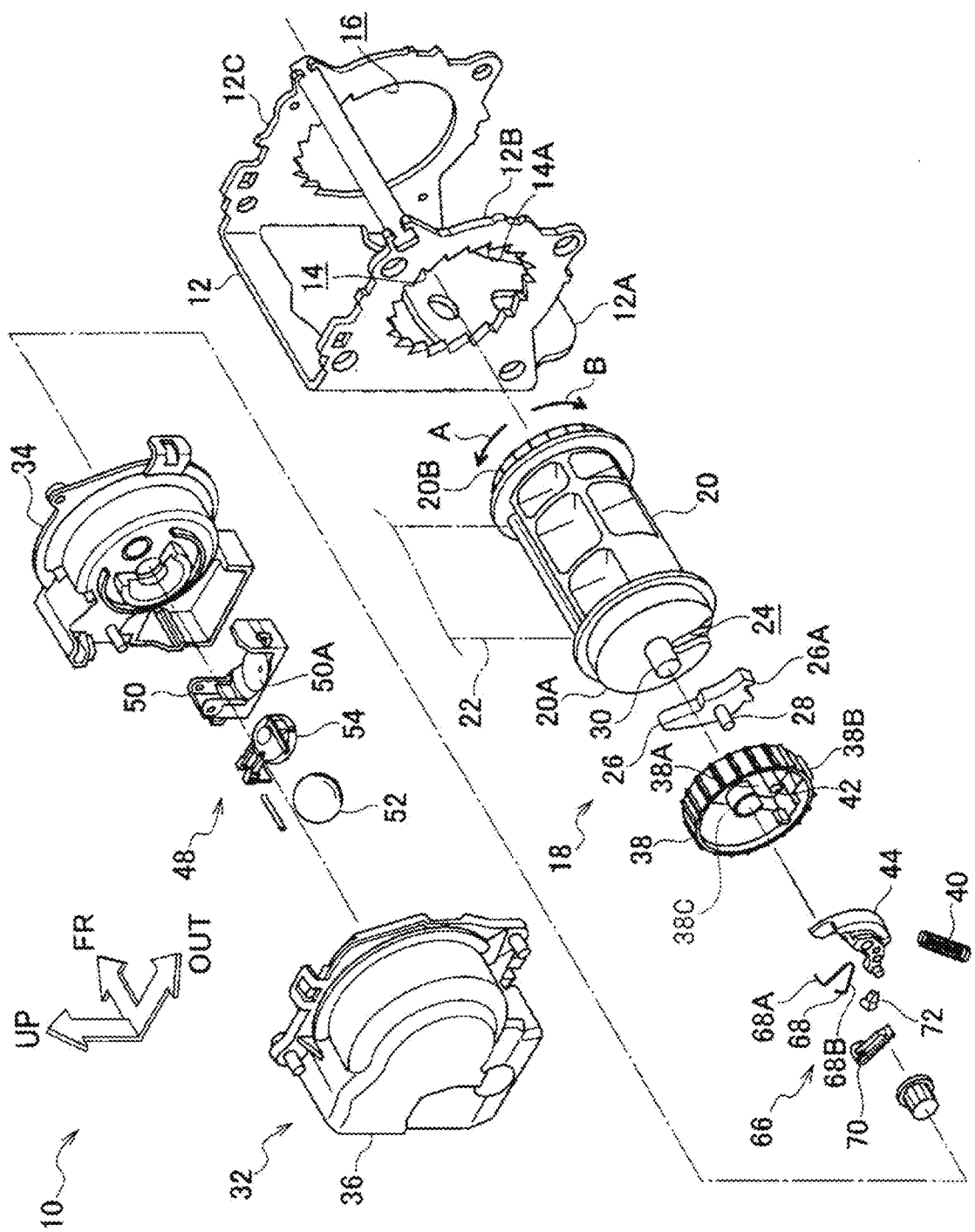
FIG. 1 is an exploded perspective view illustrating a webbing take-up device.

FIG. 1 is an exploded perspective view illustrating a webbing take-up device 10, viewed diagonally from a rear side, outside, and above. Note that in the drawings, the arrow FR indicates the vehicle front side, the arrow OUT indicates the vehicle width direction outside, and the arrow UP indicates the vehicle upper side, in a state in which the webbing take-up device 10 is attached to a vehicle. In the following explanation, simple reference to the front and rear and up and down directions refers to front and rear in the vehicle front-rear direction, and up and down in the vehicle up-down direction.

As illustrated in FIG. 1, the webbing take-up device 10 of the present exemplary embodiment includes a frame 12 formed in a substantially U-shape viewed from the vehicle upper side. The frame 12 includes a back plate 12A extending along the vehicle up-down direction with its thickness direction along the vehicle width direction, and a leg plate 12B and a leg plate 12C, which each bend and extend from either vehicle front-rear direction end portion of the back plate 12A toward the vehicle width direction outside, and are disposed facing each other. The back plate 12A of the frame 12 is fixed to a vehicle body, such that the webbing take-up device 10 is installed to the vehicle body.

A placement hole 14 and a placement hole 16, which are substantially circular shaped, are respectively formed to the leg plate 12B and the leg plate 12C. The placement hole 14 and the placement hole 16 face each other along the vehicle front-rear direction. Ratchet teeth 14A (inner teeth), configuring a lock mechanism 18, are formed around the entire outer circumference of the placement hole 14.

A substantially circular column shaped spool 20 is provided between the leg plate 12B and the leg plate 12C of the frame 12. A one-end 20A at the rear side (leg plate 12B side) of the spool 20 is disposed inside the placement hole 14 of the leg plate 12B, and an other-end 20B at the front side (leg plate 12C side) of the spool 20 is disposed inside the placement hole 16 of the leg plate 12C. The spool 20 is thereby rotatable in the circumferential direction in a state with its axial direction parallel to the front-rear direction. Note that, unless specifically stated otherwise, simple reference below to the axial direction, radial direction, and circumferential direction refers to the rotation axial direction, rotation radial direction, and rotation circumferential direction of the spool.

A base end side of an elongated belt shaped webbing 22 (belt) is anchored to the spool 20, and the webbing 22 is taken up on the spool 20 from the base end side thereof. The webbing 22 is taken up on the spool 20 when the spool 20 is rotated in the take-up direction (this being a circumferential one-direction, the direction of arrow A of FIG. 1). The spool 20 is rotated in a pull-out direction (this being a circumferential other-direction, the direction of arrow B of FIG. 1) when the webbing 22 has been pulled out from the spool 20. The webbing 22 extends from the frame 12 toward the upper side, such that the webbing 22 is fitted across an occupant seated in a non-illustrated seat of a vehicle.

A flat spiral spring (not illustrated in the drawings) is coupled to the other-end 20B of the spool 20, and the flat spiral spring is disposed at the front side of the frame 12 (the front side of the leg plate 12C). The flat spiral spring urges the spool 20 in the take-up direction, such that urging force in the take-up direction of the spool 20 acts on the webbing 22. Thus, when the webbing 22 is worn by the occupant, slack of the webbing 22 is eliminated by the urging force of the flat spiral spring, and when the webbing 22 has been released from being worn by the occupant, the webbing 22 is taken up onto the spool 20 due to the urging force of the flat spiral spring.

A housing hole 24 open toward the radial direction outside of the spool 20 is formed in the one-end 20A of the spool 20. An elongated plate shaped lock pawl 26, serving as a restricting member configuring the lock mechanism 18, is housed inside the housing hole 24 so as to be capable of moving. A lock tooth 26A is formed at a one-end of the lock pawl 26. A circular column shaped operating shaft 28 is integrally provided to the lock pawl 26, and the operating shaft 28 projects out toward the rear side from the lock pawl 26.

A circular column shaped rotation shaft 30 is integrally provided at an axial center portion of the one-end 20A of the spool 20. The rotation shaft 30 projects out from the spool 20 toward the rear side, and is disposed coaxially to the spool 20.

A sensor mechanism 32, configuring the lock mechanism 18, is provided at the rear side of the frame 12 (the rear side of the leg plate 12B).

The sensor mechanism 32 includes a bottomed, substantially circular tube shaped sensor holder 34 that is formed using a resin material and is open toward the front side (the leg plate 12B side). The sensor holder 34 is fixed to the leg plate 12B. A bottom face inside the sensor holder 34 configures a planar face shaped friction face 34A (see FIG. 4), and the friction face 34A is disposed perpendicularly to the axial direction of the spool 20.

A bottomed, substantially circular tube shaped sensor cover 36, formed using a resin material and open toward the front side, is provided at the rear side of the sensor holder 34 (the opposite side to the leg plate 12B side). The sensor cover 36 is fixed to the leg plate 12B in a state in which the sensor holder 34 is housed inside.

A V gear 38, serving as a rotating body, is provided inside the sensor holder 34. The V gear 38 is formed using a resin material, and is formed in a bottomed, circular tube shape open toward the rear side. A tube-shaped portion 38C, formed in a tube shape, is provided standing up from an axial center portion of a bottom wall 38A of the V gear 38. The V gear 38 is rotatable relative to the spool 20 due to the rotation shaft 30 of the spool 20 being inserted into the tube-shaped portion 38C.

Figure 2:
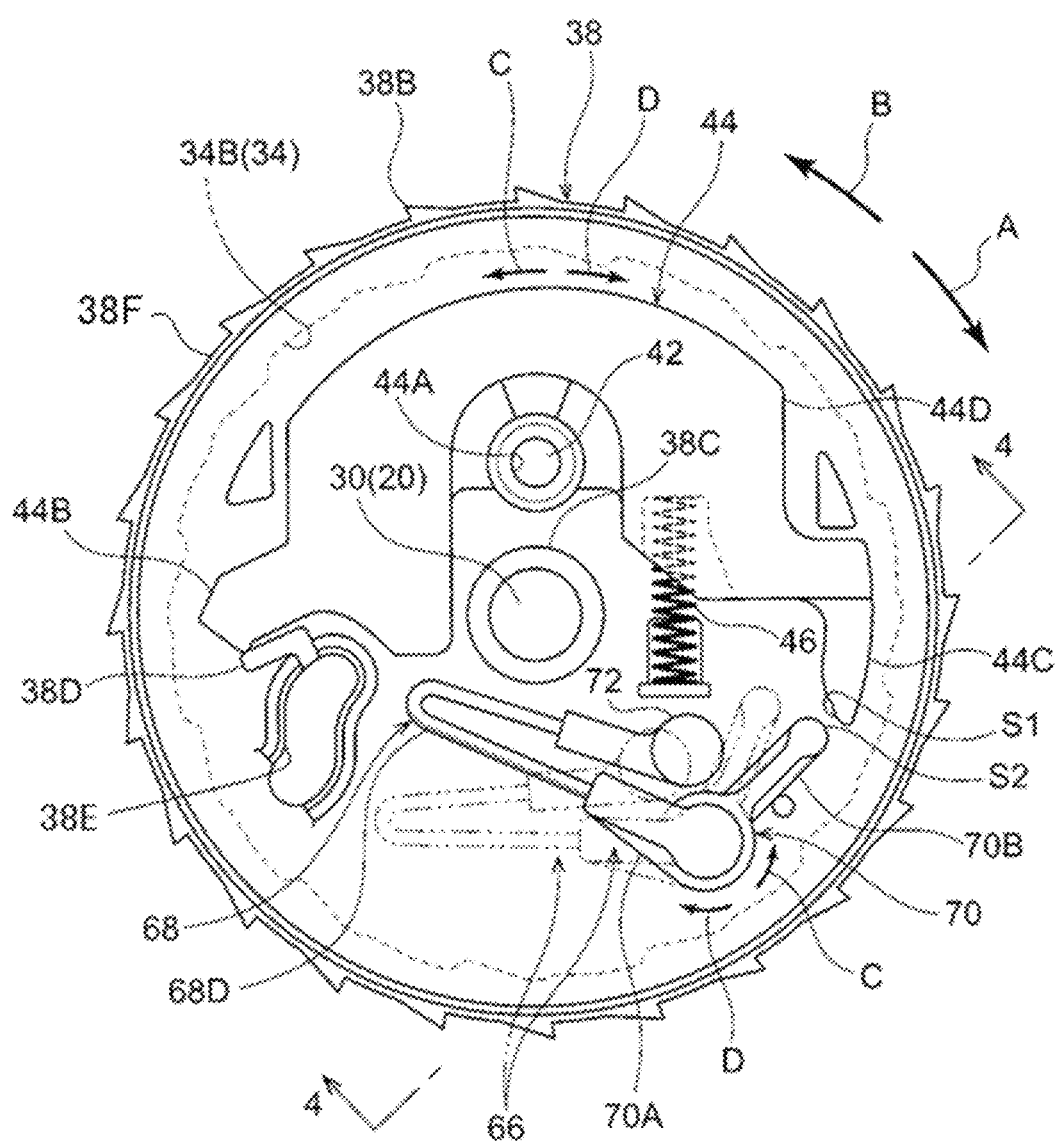
FIG. 2 is a face-on view illustrating relevant portions of a webbing take-up device.

As illustrated in FIG. 1 and FIG. 2, an elongated hole shaped operating groove 38E is formed in the bottom wall 38A of the V gear 38. The operating shaft 28 of the lock pawl 26 is inserted into the operating groove 38E. A compression coil spring 40 is interposed between the V gear 38 and the one-end 20A of the spool 20. The compression coil spring 40 urges the V gear 38 in the pull-out direction relative to the spool 20 (urges the spool 20 in the take-up direction relative to the V gear 38), and causes the operating shaft 28 to abut a length direction one-end of the operating groove 38E. Rotation of the V gear 38 in the pull-out direction relative to the spool 20 due to the urging force of the compression coil spring 40 is thereby stopped, and the V gear 38 is rotatable about the rotation shaft 30 of the spool 20 accompanying rotation of the spool 20. Ratchet teeth 38B (outer teeth) are formed around the entire outer circumference of the V gear 38. A peripheral wall 38F is formed at an outer peripheral portion of the V gear 38, projecting in the rotation axial direction with respect to the outer peripheral portion of the bottom wall 38A. The peripheral wall 38F is formed in a ring shape as viewed from the rotation axial direction. The ratchet teeth 38B project from the peripheral wall 38F toward the rotation radial direction outside.

A circular column shaped swing shaft 42 is provided standing up from the bottom wall 38A of the V gear 38. The swing shaft 42 is disposed at the radial direction outside of the center axis line of the V gear 38. The center axis line of the swing shaft 42 and the center axis line of the V gear 38 are parallel to each other.

As illustrated in FIG. 2, a W pawl 44, serving as an operating member, is supported by the swing shaft 42 so as to be capable of being swung (displaced). Specifically, the W pawl 44 is formed in a half moon shape as viewed along the axial direction, and a swing shaft insertion hole 44A, through which the swing shaft 42 is inserted, is formed at a circumferential direction (the circumferential direction of the V gear 38) intermediate portion 44D of the W pawl 44. An end portion on a circumferential direction other side of the W pawl 44 configures an engagement portion 44B that engages with an engaged portion 34B of the sensor holder 34. Furthermore, an end portion on a circumferential direction one side of the W pawl 44 configures an abutting portion 44C that extends toward a limiting cover 70 side of a limiting body 66, described later. The abutting portion 44C is formed so as to gradually become narrower on progression toward the circumferential direction one side, and a circumferential direction one side end face of the abutting portion 44C configures an abutting face S1 that abuts the limiting cover 70.

A return spring 46, serving as a compression coil spring, is interposed between the W pawl 44 and the V gear 38, and the return spring 46 urges the W pawl 44 in a recovery direction (the arrow C direction). Swinging of the W pawl 44 in the recovery direction by the urging force of the return spring 46 is stopped by a restriction protruding portion 38D provided to the V gear 38. Note that a position of the W pawl 44 in a state in which swinging of the W pawl 44 in the recovery direction is stopped by the restriction protruding portion 38D provided to the V gear 38 is called a reset position, serving as a first position.

When the V gear 38 is rotated in the pull-out direction, force due to inertia acts on the W pawl 44 in the take-up direction with respect to the V gear 38. The W pawl 44 thereby attempts to swing in an operating direction (the arrow D direction) with respect to the V gear 38. When the V gear 38 has been suddenly rotated in the pull-out direction, force due to inertia acting on the W pawl 44 overcomes the urging force of the return spring 46. The W pawl 44 is thereby swung in the operating direction with respect to the V gear 38, and the engagement portion 44B of the W pawl 44 engages with the engaged portion 34B of the sensor holder 34. As a result thereof, rotation of the V gear 38 in the pull-out direction is stopped. Note that a position of the W pawl 44 in a state in which the engagement portion 44B of the W pawl 44 is able to engage with the engaged portion 34B of the sensor holder 34 is called an operation position, serving as a second position.

As illustrated in FIG. 1, an acceleration sensor 48 is provided at a lower end portion of the sensor holder 34. The acceleration sensor 48 includes a substantially U-shaped housing 50 open toward the upper side as viewed face-on to the vehicle, and a recess shaped curved face 50A is formed at an upper face of a bottom wall of the housing 50. A spherical shaped ball 52 is placed on the curved face 50A, and a substantially plate shaped lever 54 is placed at the upper side of the ball 52. A base end of the lever 54 is supported by a side wall of the housing 50 so as to be capable of pivoting, and the V gear 38 is disposed at the upper side of a leading end of the lever 54. The lever 54 is pivoted toward the upper side due to the ball 52 rolling over the curved face 50A of the housing 50 and rising. The leading end of the lever 54 is thereby meshed with the ratchet teeth 38B of the V gear 38, so as to stop rotation of the V gear 38 in the pull-out direction.

When as described above, against the urging force of the compression coil spring 40, the spool 20 is rotated in the pull-out direction relative to the V gear 38 while rotation of the V gear 38 in the pull-out direction is stopped, the operating shaft 28 of the lock pawl 26 is moved to a length direction other end side of the operating groove 38E of the V gear 38, as illustrated in FIG. 1 and FIG. 2. As a result thereof, the lock pawl 26 is moved toward the radial direction outside of the spool 20 (of the one-end 20A), and the lock tooth 26A of the lock pawl 26 thereby meshes with the ratchet teeth 14A of the frame 12 (of the leg plate 12B). As a result thereof, rotation of the spool 20 in the pull-out direction is locked (restricted), and the webbing 22 is thereby locked (restricted) from being pulled out from the spool 20.

Figure 4:
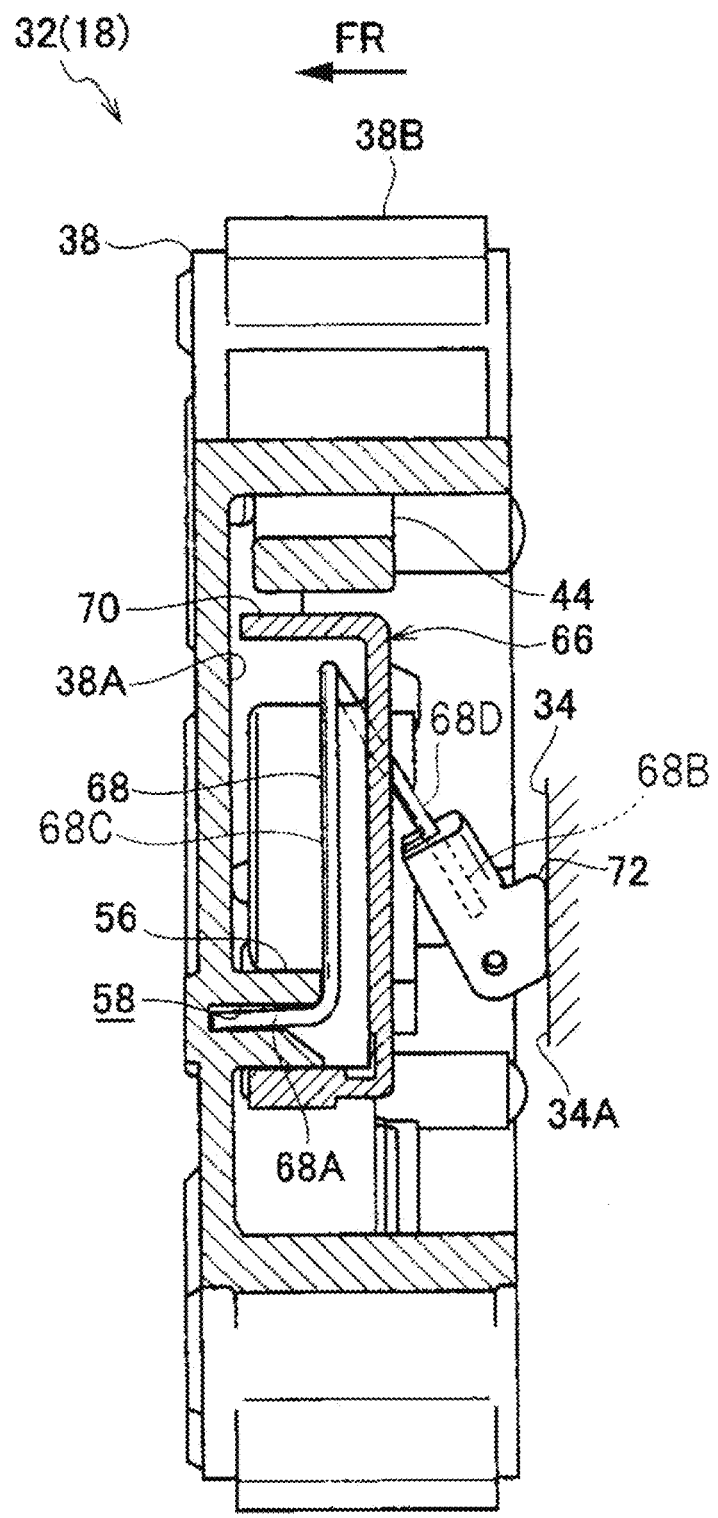
FIG. 4 is a cross-section illustrating relevant portions of the webbing take-up device sectioned along line 4-4 of FIG. 2.

As illustrated in FIG. 4, a support shaft 56 formed in a circular column shape is provided standing up from the bottom wall 38A of the V gear 38. The center axis line of the support shaft 56 and the center axis line of the V gear 38 are parallel to each other. A support hole 58 is formed in an axial center portion of the support shaft 56. The support hole 58 is open toward the rear side (the friction face 34A side of the sensor holder 34), and a front side thereof is closed off by the bottom wall 38A.

The limiting body 66 is supported by the support shaft 56 so as to be capable of pivoting. As illustrated in FIG. 2, the limiting body 66 is configured including a friction spring 68, formed by bending an elongated rod shaped member, and the limiting cover 70 and a friction cover 72 that are attached to the friction spring 68.

As illustrated in FIG. 4, a one-end portion of the friction spring 68 configures an insertion portion 68A that is inserted into, and supported by, the support hole 58, and an other-end portion of the friction spring 68 configures a friction cover attachment portion 68B that the friction cover 72 is attached to. A location on the friction spring 68 between the insertion portion 68A and the friction cover attachment portion 68B, which is also a location at the insertion portion 68A side, configures a limiting cover attachment portion 68C that the limiting cover 70 (see FIG. 2) is attached to.

Furthermore, a location on the friction spring 68 between the insertion portion 68A and the friction cover attachment portion 68B, which is also a location of the friction cover attachment portion 68B, configures a flexed portion 68D. The flexed portion 68D is flexed in a state in which the limiting body 66 is disposed between the friction face 34A side of the sensor holder 34, and the bottom wall 38A of the V gear 38. The friction cover 72 can be pressed against the friction face 34A of the sensor holder 34 by the resilient force of the flexed portion 68D. Thus, when the V gear 38 is rotated, the friction cover 72 slides over the friction face 34A, such that friction force is generated between the friction cover 72 and the friction face 34A.

As illustrated in FIG. 2, the limiting cover 70 is formed using a resin material, and is formed in a substantially L-shape in face-on view. The limiting cover 70 includes a rectangular block shaped attachment portion 70A that is attached to the limiting cover attachment portion 68C of the friction spring 68, and an abutted portion 70B that extends from a one-end portion of the attachment portion 70A toward the abutting portion 44C side of the W pawl 44. An end face of the abutted portion 70B configures an abutted face S2 that is abutted by the abutting portion 44C of the W pawl 44, and the abutted face S2 is curved in an arc shape in face-on view.

Figure 3:
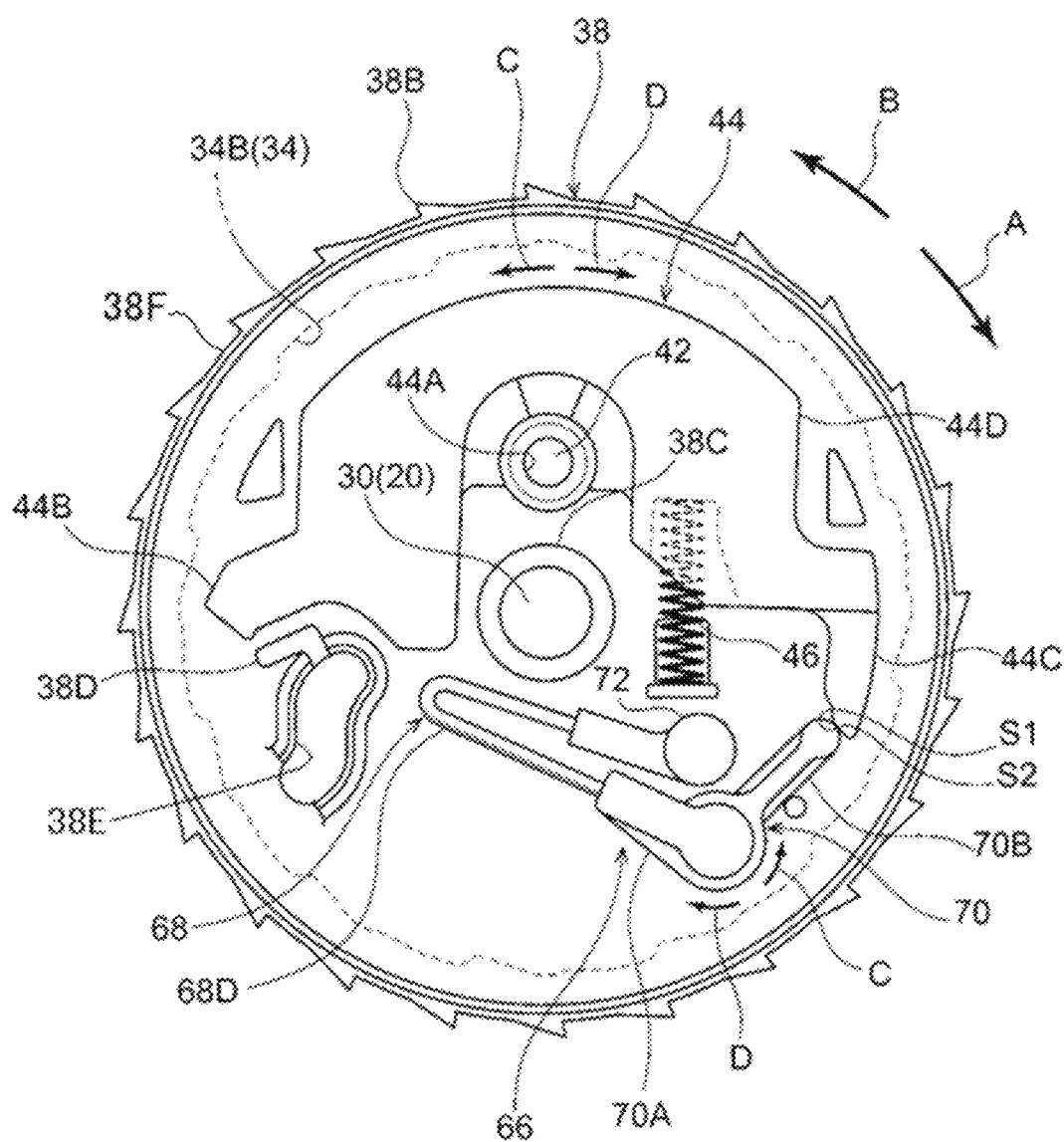
FIG. 3 is a face-on view corresponding to FIG. 2 and illustrating relevant portions of a webbing take-up device in a state in which a W pawl has contacted a limiting cover.

When the V gear 38 is rotated in the take-up direction, the limiting body 66 is pivoted toward a one-side (the arrow D direction side) about the support shaft 56 (see FIG. 4), and the limiting body 66 is pivoted to a limiting position (the position illustrated by the solid lines in FIG. 2). Then, as illustrated in FIG. 3, the abutting portion 44C (the abutting face S1) of the W pawl 44 abuts the abutted portion 70B (the abutted face S2) of the limiting cover 70, such that the W pawl 44 is limited from swinging in the operating direction relative to the V gear 38.

As illustrated in FIG. 2, when the V gear 38 is rotated in the pull-out direction, the limiting body 66 is pivoted toward an other-side (the arrow C direction side) about the support shaft 56 (see FIG. 4), and the limiting body 66 is pivoted to the permitting position (the position illustrated by imaginary lines in FIG. 2). Even if the W pawl 44 is swung, the abutting portion 44C (abutting face S1) of the W pawl 44 is in a state that does not abut the abutted portion 70B (abutted face S2) of the limiting cover 70, such that the W pawl 44 is permitted to swing in the operating direction relative to the V gear 38.

Operation and Advantageous Effects of Present Exemplary Embodiment

Explanation follows regarding operation and advantageous effects of the present exemplary embodiment.

In the webbing take-up device 10 with the above configuration, the webbing 22 is pulled, and the spool 20 and the V gear 38 are rotated in the pull-out direction against the urging force of the flat spiral spring, such that the webbing 22 is pulled out from the spool 20 to be worn by an occupant.

When the vehicle has rapidly decelerated, the ball 52 rolls over the curved face 50A of the housing 50 in the acceleration sensor 48 and rises, such that the lever 54 is pivoted toward the upper side, and the leading end thereof is meshed with the ratchet teeth 38B of the V gear 38. The V gear 38 is thereby stopped from rotating in the pull-out direction.

When the vehicle has rapidly decelerated further, the occupant is moved under force due to inertia, such that the webbing 22 is pulled out from the spool 20 by the occupant, and the spool 20 and the V gear 38 are suddenly rotated in the pull-out direction.

When the V gear 38 is further rotated in the pull-out direction, the limiting body 66 is pivoted by friction force occurring between the friction face 34A of the sensor holder 34 and the friction cover 72, and is pivoted to the permitting position (the position illustrated by imaginary lines in FIG. 2). As a result thereof, the W pawl 44 is permitted to swing in the operating direction relative to the V gear 38.

Thus, when the V gear 38 has been suddenly rotated in the pull-out direction as described above, the W pawl 44 is swung in the operating direction relative to the V gear 38, the engagement portion 44B of the W pawl 44 engages with the engaged portion 34B of the sensor holder 34, and the V gear 38 is stopped from rotating in the pull-out direction.

Due to the spool 20 being rotated, against the urging force of the compression coil spring 40, in the pull-out direction relative to the V gear 38 while the V gear 38 has been stopped from rotating in the pull-out direction, the operating shaft 28 of the lock pawl 26 is moved toward the length direction other-end side of the operating groove 38E of the V gear 38, and the lock pawl 26 is moved toward the radial direction outside of the spool 20. The lock tooth 26A of the lock pawl 26 is thereby meshed with the ratchet teeth 14A of the frame 12, and the spool 20 is locked against rotating in the pull-out direction. The webbing 22 is thereby locked against being pulled out from the spool 20, and the occupant is restrained by the webbing 22.

However, when the webbing 22 has been released from being worn by the occupant, the spool 20 and the V gear 38 are rotated in the take-up direction by the urging force of the flat spiral spring, and the webbing 22 is taken up onto the spool 20.

Note that, when the webbing 22 has been completely taken up onto the spool 20, there is a possibility that the spool 20 and the V gear 38 are suddenly rotated in the pull-out direction as a reaction to the rotation in the take-up direction being stopped.

Thus, when the V gear 38 is rotated in the take-up direction, the limiting body 66 is pivoted by friction force occurring between the friction face 34A of the sensor holder 34 and the friction cover 72, and is moved to the limiting position (the position illustrated by solid lines in FIG. 2). As illustrated in FIG. 3, the abutting portion 44C (abutting face S1) of the W pawl 44 then abuts the abutted portion 70B (abutted face S2) of the limiting cover 70, such that the W pawl 44 is limited from swinging in the operating direction relative to the V gear 38.

Thus, since rotation of the V gear 38 in the pull-out direction is not stopped due to the engagement portion 44B of the W pawl 44 not engaging with the sensor holder 34, the lock pawl 26 is not moved toward the radial direction outside of the spool 20. Thus rotation of the spool 20 in the pull-out direction is not locked due to the lock tooth 26A of the lock pawl 26 not meshing with the ratchet teeth 14A of the frame 12. Namely, in the present exemplary embodiment, locking (what is referred to as an end locking) of the pulling out of the webbing 22 from the spool 20 can be prevented or suppressed, enabling the webbing 22 to be pulled out from the spool 20.

Shock Resistance Raising Configuration

Next, description follows regarding a configuration of the present disclosure applied to raise shock resistance. Specifically, description follows regarding a configuration to suppress the return spring 46 from coming out from between the V gear 38 and the W pawl 44 when a shock is imparted to the webbing take-up device 10, such as due to the webbing take-up device 10 being dropped or the like.

Figure 5:
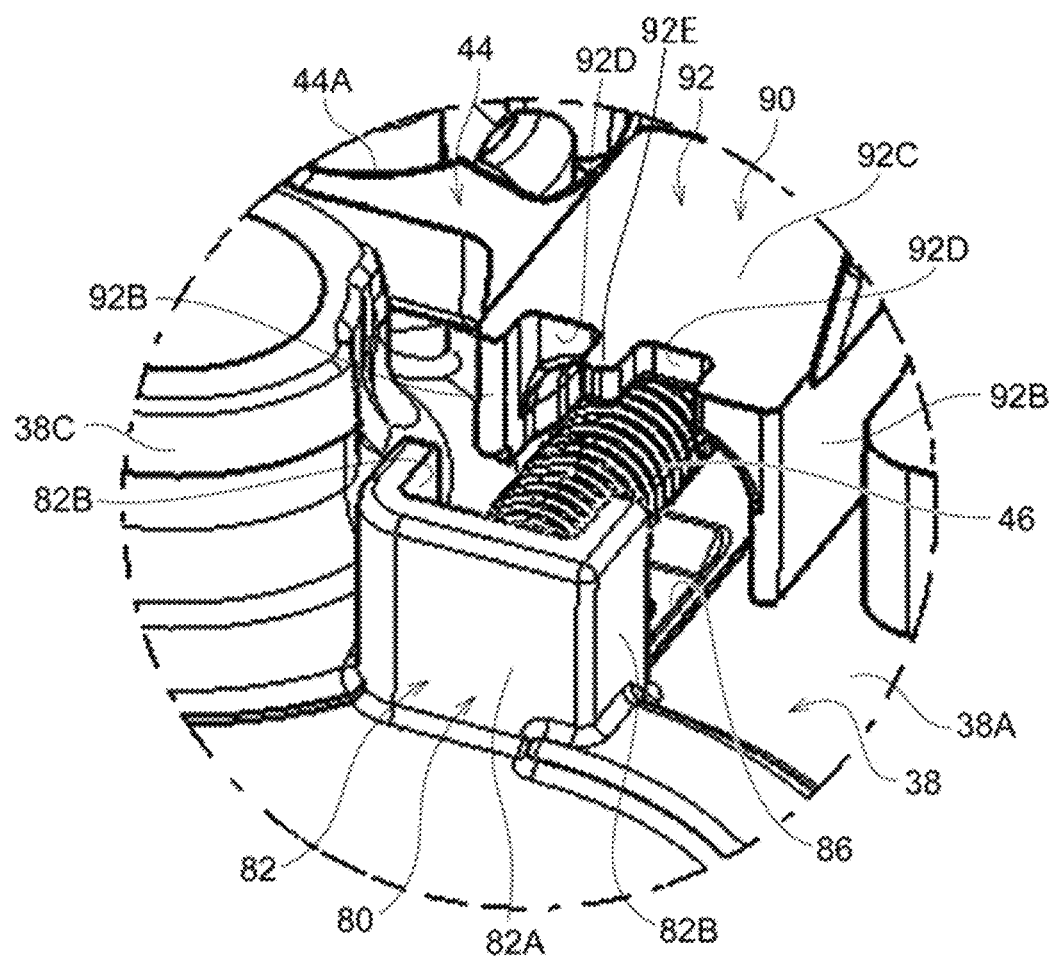
FIG. 5 is an enlarged perspective view illustrating an enlargement of a portion of a V gear and a W pawl where a return spring is provided.
Figure 6:
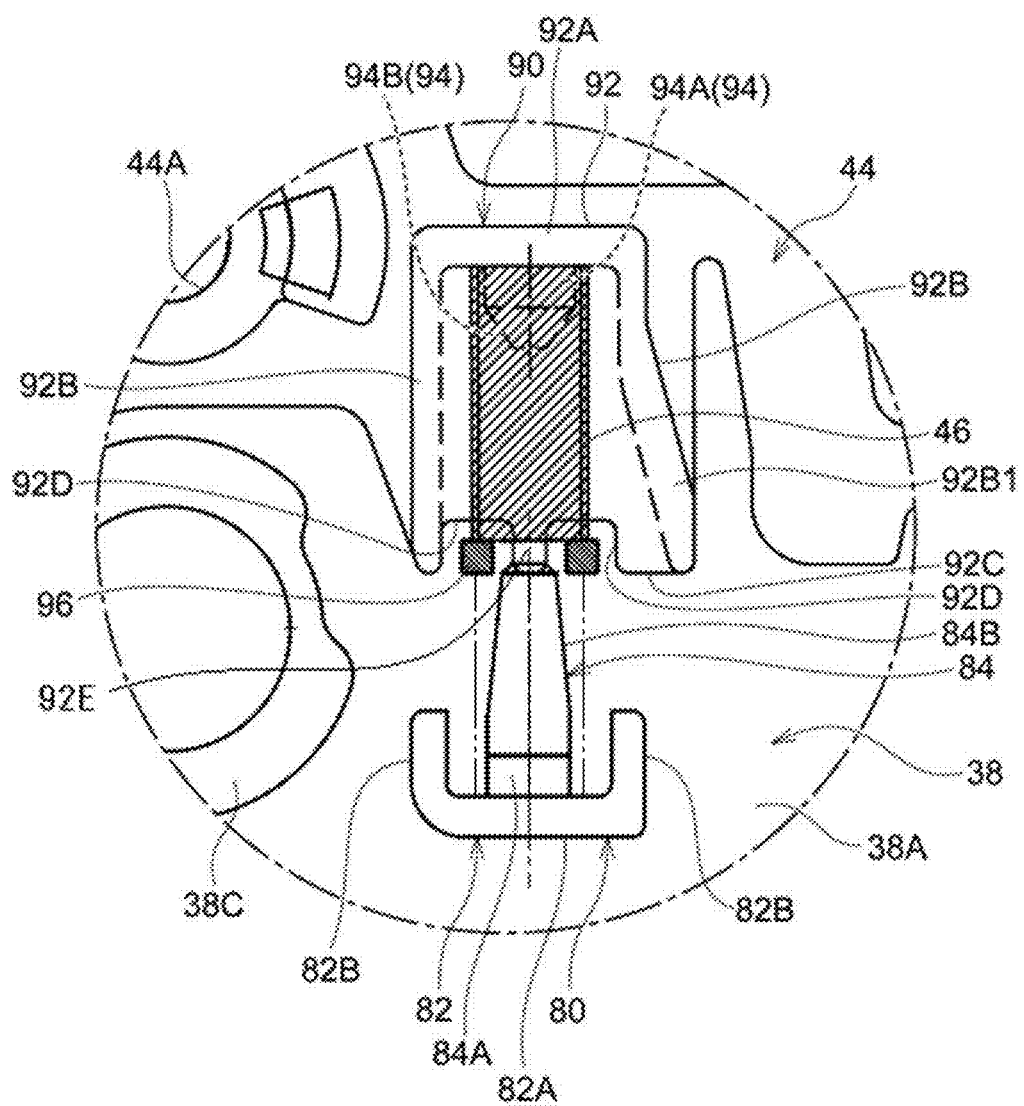
FIG. 6 is an enlarged face-on view illustrating an enlargement of a portion of a V gear and a W pawl where a return spring is provided.

As illustrated in FIG. 5 and FIG. 6, a first spring engagement portion 80 is provided to the V gear 38 to engage with a one-side of the return spring 46. Moreover, a second spring engagement portion 90 is provided to the W pawl 44 to engage with an other-side of the return spring 46.

The first spring engagement portion 80 includes an engagement wall 82 upstanding from the bottom wall 38A in the same direction as the swing shaft 42, and a boss portion 84 that projects out from the engagement wall 82 toward the second spring engagement portion 90 side. The engagement wall 82 is formed in a U-shape open on the second spring engagement portion 90 side when viewed along the axial direction. More specifically, the engagement wall 82 includes a bottom wall portion 82A that is formed in a plate shape, with a thickness direction thereof facing toward the second spring engagement portion 90 side. The engagement wall 82 includes a pair of side wall portions 82B respectively extending toward the second spring engagement portion 90 side from an end portion on the tube-shaped portion 38C side of the bottom wall portion 82A and from an end portion on the opposite side to the tube-shaped portion 38C. The boss portion 84 projects from the bottom wall portion 82A toward the second spring engagement portion 90 side, and is disposed at a center between the pair of side wall portions 82B. A projection direction base end side of the boss portion 84 is configured by a circular pillar portion 84A set with an external diameter that is a constant dimension along the projection direction. A range of the boss portion 84 spanning from an intermediate portion in the projection direction to a leading end portion thereof is configured by a truncated cone shaped portion 84B set such that the external diameter thereof is gradually smaller on progression in the projection direction. As illustrated in FIG. 5, at a portion where the boss portion 84 (see FIG. 6) overlaps in the axial direction with the bottom wall 38A of the V gear 38, a through hole 86 is formed penetrating in the axial direction through the bottom wall 38A. Note that the through hole 86 is omitted in the drawing of FIG. 6.

As illustrated in FIG. 5 and FIG. 6, the second spring engagement portion 90 includes a housing section 92 formed in a box shape open toward the bottom wall 38A side of the V gear 38 and toward the first spring engagement portion 80 side, and includes a boss portion 94 that projects out from the housing section 92 toward the first spring engagement portion 80 side. The housing section 92 includes a bottom wall 92A having a face of a portion thereof facing toward the first spring engagement portion 80 side. Moreover, the housing section 92 also includes a pair of first side walls 92B that extend toward the first spring engagement portion 80 side from an end portion on the swing shaft insertion hole 44A side of the bottom wall 92A and from an end portion on the opposite side to the swing shaft insertion hole 44A. Note that a location 92B1 on the first spring engagement portion 80 side of the first side wall 92B on the opposite side to the swing shaft insertion hole 44A is inclined toward the opposite side to the swing shaft insertion hole 44A on progression toward the first spring engagement portion 80 side. Furthermore, the housing section 92 also includes a second side wall 92C that connects an end portion of the pair of first side walls 92B on the opposite side to the bottom wall 38A of the V gear 38 together with the end portion of the bottom wall 92A on the opposite side to the bottom wall 38A of the V gear 38. The return spring 46 is disposed in a space (space inside the housing section 92) surrounded by the bottom wall 92A, the pair of first side walls 92B, and the second side wall 92C. A pair of recesses 92D that are open toward the first spring engagement portion 80 side (the boss portion 84 side) are formed to an end portion on the first spring engagement portion 80 side of the second side wall 92C. A tongue portion 92E formed in a tongue shape is configured at a location between the pair of recesses 92D of the second side wall 92C. The boss portion 94 projects from the bottom wall 92A toward the first spring engagement portion 80 side, and is disposed at a center between the pair of first side walls 92B. A circular pillar portion 94A set with an external diameter that is a fixed dimension along the projection direction is configured at the projection direction base end side of the boss portion 94. A projection direction leading end portion of the boss portion 94 is configured by a truncated cone shaped portion 94B set such that the external diameter thereof is gradually smaller toward the projection direction. A dimension in the projection direction of the boss portion 94 on the second spring engagement portion 90 side is set to a dimension smaller than the projection direction dimension of the boss portion 84 on the first spring engagement portion 80 side. In the present exemplary embodiment, the boss portion 94 is covered by the second side wall 92C of the housing section 92 from the opposite side to the bottom wall 38A of the V gear 38. In contrast thereto, the boss portion 94 is configured so as not to be covered by a portion of the housing section 92 from the bottom wall 38A side of the V gear 38. In other words, there is no wall configured to the housing section 92 on the bottom wall 38A side of the V gear 38.

As illustrated in FIG. 6, to assemble the return spring 46 to the first spring engagement portion 80 and the second spring engagement portion 90, first the boss portion 94 of the second spring engagement portion 90 is inserted into the other-side of the return spring 46. Then the entire return spring 46 is disposed inside the housing section 92 while in a state in which the return spring 46 has been compressed toward the bottom wall 92A side of the housing section 92. Note that a setting tool 96 is anchored to the pair of recesses 92D of the housing section 92. This means that the entire return spring 46 is held in a state disposed inside the housing section 92.

Next the W pawl 44 is assembled to the V gear 38 while the entire return spring 46 is in a state disposed in the housing section 92, and the setting tool 96 is removed. The return spring 46 inside the housing section 92 accordingly extends under its own recover force and, as illustrated by the double-dot broken line in FIG. 6, a state is achieved in which the boss portion 84 of the first spring engagement portion 80 is inserted into the one-side of the return spring 46. As a result thereof, the return spring 46 becomes in a state spanning between the first spring engagement portion 80 and the second spring engagement portion 90. Namely, the return spring 46 is in a state assembled to the first spring engagement portion 80 and the second spring engagement portion 90.

The W pawl 44 illustrated in FIG. 6 is positioned at the reset position. In a state in which the W pawl 44 is positioned at the reset position, an end portion on the housing section 92 side of the boss portion 84 is positioned inside the housing section 92. This means that in the present exemplary embodiment, the end portion on the housing section 92 side of the boss portion 84 is positioned inside the housing section 92 in all states from a state when the W pawl 44 is positioned at the reset position through to a state when the W pawl 44 is positioned at the operation position.

Figure 7:
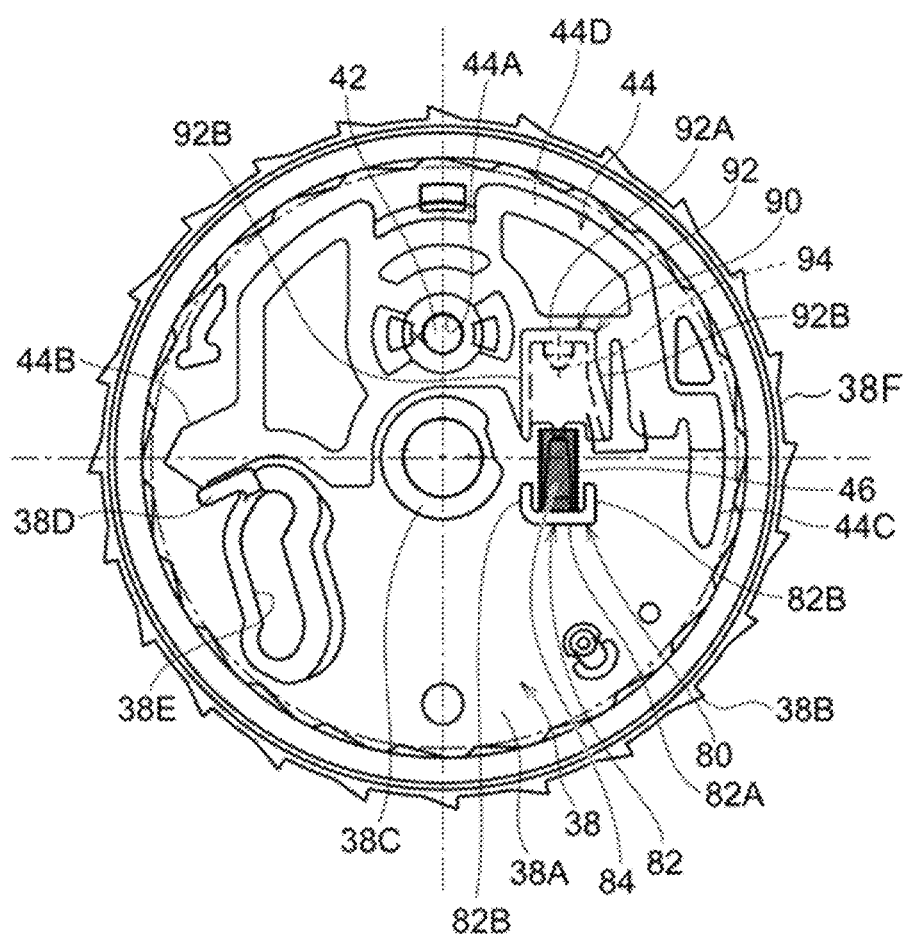
FIG. 7 is face-on view illustrating a V gear, a W pawl, and a return spring when a shock is imparted to a webbing take-up device.

Moreover, FIG. 7 illustrates the V gear 38, the W pawl 44, and the return spring 46 when a shock from the second spring engagement portion 90 side toward the first spring engagement portion 80 side has been input to the webbing take-up device 10, due to the webbing take-up device 10 being dropped or the like. As illustrated in this diagram, the return spring 46 is compressed toward the first spring engagement portion 80 side by force due to inertia acting on the return spring 46 when shock from the second spring engagement portion 90 side toward the first spring engagement portion 80 side is input to the webbing take-up device 10. Moreover, the W pawl 44 is urged toward the restriction protruding portion 38D side by force due to inertia acting on the W pawl 44 when shock from the second spring engagement portion 90 side toward the first spring engagement portion 80 side is input to the webbing take-up device 10. Namely, the W pawl 44 is held in a state positioned at the reset position. FIG. 7 illustrates a state in which the return spring 46 is completely compressed toward the first spring engagement portion 80 side. In this state too, the end portion on the second spring engagement portion 90 side of the return spring 46 is positioned inside the housing section 92.

Figure 8:
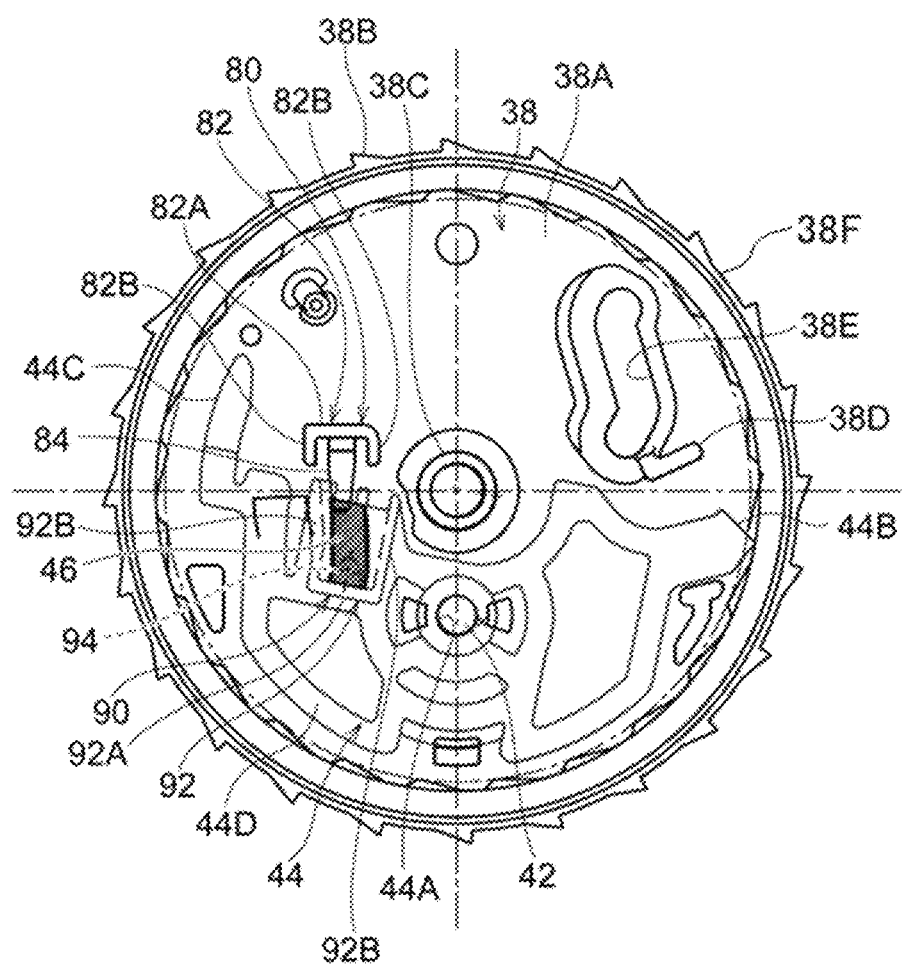
FIG. 8 is a face-on view illustrating a V gear, a W pawl, and a return spring when a shock is imparted to a webbing take-up device.

Moreover, FIG. 8 illustrates the V gear 38, the W pawl 44, and the return spring 46 when a shock from the first spring engagement portion 80 side toward the second spring engagement portion 90 side has been input to the webbing take-up device 10, due to the webbing take-up device 10 being dropped or the like. As illustrated in this diagram, the return spring 46 is compressed toward the second spring engagement portion 90 side by force due to inertia acting on the return spring 46 when shock from the first spring engagement portion 80 side toward the second spring engagement portion 90 side is input to the webbing take-up device 10. Moreover, the W pawl 44 is displaced toward the operation position side by force due to inertia acting on the W pawl 44 when shock from the first spring engagement portion 80 side toward the second spring engagement portion 90 side is input to the webbing take-up device 10. FIG. 8 illustrates a state in which the return spring 46 is completely compressed toward the second spring engagement portion 90 side. In this state too, the boss portion 84 of the first spring engagement portion 80 is inserted into the end portion on the first spring engagement portion 80 side of the return spring 46.

In the webbing take-up device 10 applied with the configuration of the present disclosure as described above, as illustrated in FIG. 7, in a state in which the return spring 46 is completely compressed toward the first spring engagement portion 80 side, the end portion on the second spring engagement portion 90 side of the return spring 46 is positioned inside the housing section 92. This means that displacement of the end portion on the second spring engagement portion 90 side of the return spring 46 is limited by the housing section 92 when shock is imparted to the webbing take-up device 10 so as to compress the return spring 46 toward the first spring engagement portion 80 side. This thereby enables the return spring 46 to be suppressed from coming out from between the first spring engagement portion 80 and the second spring engagement portion 90.

Moreover, as illustrated in FIG. 8, in a state in which the return spring 46 is completely compressed toward the second spring engagement portion 90 side, the boss portion 84 of the first spring engagement portion 80 is inserted into the end portion on the first spring engagement portion 80 side of the return spring 46. This means that displacement of the end portion on the first spring engagement portion 80 side of the return spring 46 is limited by the boss portion 84 when shock is imparted to the webbing take-up device 10 so as to compress the return spring 46 toward the second spring engagement portion 90 side. This thereby enables the return spring 46 to be suppressed from coming out from between the first spring engagement portion 80 and the second spring engagement portion 90.

Moreover, in the webbing take-up device 10 applied with the configuration of the present disclosure, as illustrated in FIG. 6, the end portion on the housing section 92 side of the boss portion 84 is configured so as to be positioned inside the housing section 92 in all states from a state when the W pawl 44 is positioned at the reset position through to a state when the W pawl 44 is positioned at the operation position. This thereby enables the return spring 46 to be even better suppressed from coming out from between the first spring engagement portion 80 and the second spring engagement portion 90.

Moreover, in the webbing take-up device 10 applied with the configuration of the present disclosure, the box shaped housing section 92 is provided to the second spring engagement portion 90 of the W pawl 44. This means that a manufacturing machine for the V gear 38, and manufacturing processes therefor, can be suppressed from becoming complicated better than with a configuration in which a box shaped housing section 92 is provided to the first spring engagement portion 80 of the V gear 38. Specifically, this enables a need to provide a sliding mold to form the box shaped housing section 92 (a sliding mold that slides along the pair of first side walls 92B and the second side wall 92C that configure the box shaped housing section 92) to be eliminated for a mold for forming the V gear 38 in a configuration in which a box shaped housing section 92 is provided at the first spring engagement portion 80 of the V gear 38. As a result thereof, a process to displace such a sliding mold is not needed in the processes to form the V gear 38.

Moreover, in the webbing take-up device 10 applied with the configuration of the present disclosure, as illustrated in FIG. 5, the bottom wall 38A is formed with the through hole 86 penetrating through in the axial direction at a portion where the bottom wall 38A of the V gear 38 overlaps with the boss portion 84 (see FIG. 6) in the axial direction. Forming the through hole 86 enables a need for a sliding mold for forming the boss portion 84 to be eliminated. Namely, in the webbing take-up device 10 applied with the configuration of the present disclosure, the V gear 38 can be formed by an upper mold and a lower mold divided in the axial direction.

Moreover, in the webbing take-up device 10 applied with the configuration of the present disclosure, as illustrated in FIG. 6, the setting tool 96 can be anchored to the pair of recesses 92D of the housing section 92. This thereby enables a state to be maintained in which the entire return spring 46 is disposed inside the housing section 92. As a result thereof, good operability can be achieved when setting the return spring 46 between the first spring engagement portion 80 and the second spring engagement portion 90.

Note that although the webbing take-up device 10 applied with the configuration of the present disclosure has been described for an example in which the setting tool 96 can be anchored to the pair of recesses 92D of the housing section 92, the present disclosure is not limited thereto. Whether or not the pair of recesses 92D is provided may be appropriately set in consideration of the assembly processes and the like of the webbing take-up device 10.

Moreover, although the webbing take-up device 10 applied with the configuration of the present disclosure has been described for an example in which the box shaped housing section 92 is provided to the second spring engagement portion 90 of the W pawl 44, and the boss portion 84 is provided to the first spring engagement portion 80 of the V gear 38, the present disclosure is not limited thereto. For example, a configuration may be adopted in which the box shaped housing section 92 is provided to the first spring engagement portion 80 of the V gear 38, and the boss portion 84 is provided to the second spring engagement portion 90 of the W pawl 44.

Moreover, although the webbing take-up device 10 applied with the configuration of the present disclosure has been described for an example in which the boss portion 94 is provided to the second spring engagement portion 90 of the W pawl 44, the present disclosure is not limited thereto. For example, a configuration may be adopted in which the boss portion 94 is omitted.

Moreover, although the webbing take-up device 10 applied with the configuration of the present disclosure has been described for an example in which the end portion on the housing section 92 side of the boss portion 84 is positioned inside the housing section 92 in all states from a state when the W pawl 44 is positioned at the reset position through to a state when the W pawl 44 is positioned at the operation position, the present disclosure is not limited thereto. For example, the boss portion 84 may be configured so as to be positioned outside the housing section 92 in some states or all states from a state when the W pawl 44 is positioned at the reset position through to a state when the W pawl 44 is positioned at the operation position.

Moreover, although the webbing take-up device 10 applied with the configuration of the present disclosure has been described for an example in which, in both cases of the case illustrated in FIG. 7 and the case illustrated in FIG. 8, the return spring 46 is suppressed from coming out from between the first spring engagement portion 80 and the second spring engagement portion 90, the present disclosure is not limited thereto. For example, the return spring 46 may be suppressed from coming out from between the first spring engagement portion 80 and the second spring engagement portion 90 in one case out of the case illustrated in FIG. 7 or the case illustrated in FIG. 8.

Although description has been given of exemplary embodiments of the present disclosure, the present disclosure is not limited thereby, and obviously various other modifications may be implemented within a scope not departing from the spirit of the present disclosure.

What is claimed is:

1. A webbing take-up device comprising:
   a spool that is able to take up webbing fitted over an occupant, with the webbing being taken up by the spool being rotated in a take-up direction, and with the spool being rotated in a pull-out direction by the webbing being pulled out;
   a rotating body that is rotatable accompanying rotation of the spool and that includes a first spring engagement portion;
   a restricting member that is operated to restrict rotation of the spool in the pull-out direction;
   an operating member that is supported by the rotating body, that is able to swing with respect to the rotating body, that operates the restricting member by swinging from a first position side to a second position side when the rotating body has been rotated in the pull-out direction at a specific speed or greater, and that includes a second spring engagement portion;
   a compression coil spring that is provided between the first spring engagement portion and the second spring engagement portion, and that urges the operating member toward the first position side;
   a boss portion that is provided at one of the first spring engagement portion or the second spring engagement portion, and that is inserted into one side of the compression coil spring; and
   a housing section that is provided at another of the first spring engagement portion or the second spring engagement portion, with another side of the compression coil spring housed therein,
   wherein displacement of a first end portion is limited by the boss portion or by the housing section in a state in which the operating member is positioned at the first position, and in a state in which the compression coil spring is completely compressed toward a first spring engagement portion side, the first end portion being an end portion of the compression coil spring and facing the second spring engagement portion.

2. The webbing take-up device of claim 1, wherein a third end portion is positioned inside the housing section in all states from a state when the operating member is positioned at the first position through to a state when the operating member is positioned at the second position, the third end portion being an end portion of the boss portion and facing the housing section.

3. The webbing take-up device of claim 1, wherein the housing section is provided at the second spring engagement portion.

4. The webbing take-up device of claim 1, wherein a recess is formed at a fourth end portion, the fourth end portion being an end portion of the housing section and facing the boss portion, and the recess being open toward the boss portion.

5. A webbing take-up device comprising:
   a spool that is able to take up webbing fitted over an occupant, with the webbing being taken up by the spool being rotated in a take-up direction, and with the spool being rotated in a pull-out direction by the webbing being pulled out;
   a rotating body that is rotatable accompanying rotation of the spool and that includes a first spring engagement portion;
   a restricting member that is operated to restrict rotation of the spool in the pull-out direction;
   an operating member that is supported by the rotating body, that is able to swing with respect to the rotating body, that operates the restricting member by swinging from a first position side to a second position side when the rotating body has been rotated in the pull-out direction at a specific speed or greater, and that includes a second spring engagement portion;
   a compression coil spring that is provided between the first spring engagement portion and the second spring engagement portion, and that urges the operating member toward the first position side;
   a boss portion that is provided at one of the first spring engagement portion or the second spring engagement portion, and that is inserted into one side of the compression coil spring; and
   a housing section that is provided at another of the first spring engagement portion or the second spring engagement portion, with another side of the compression coil spring housed therein,
   wherein displacement of a second end portion is limited by the boss portion or by the housing section in a state in which the operating member is positioned at the second position, and in a state in which the compression coil spring is completely compressed toward a second spring engagement portion side, the second end portion being an end portion of the compression coil spring and facing the first spring engagement portion.

6. The webbing take-up device of claim 5, wherein a third end portion is positioned inside the housing section in all states from a state when the operating member is positioned at the first position through to a state when the operating member is positioned at the second position, the third end portion being an end portion of the boss portion and facing the housing section.

7. The webbing take-up device of claim 5, wherein the housing section is provided at the second spring engagement portion.

8. The webbing take-up device of claim 5, wherein a recess is formed at a fourth end portion, the fourth end portion being an end portion of the housing section and facing the boss portion, and the recess being open toward the boss portion.

* * * * *